United States Patent [19]

Ishii

[11] Patent Number: 5,052,225

[45] Date of Patent: Oct. 1, 1991

[54] ACOUSTIC GYROSCOPE

[76] Inventor: Yasushi Ishii, 20-5, Kinuta 8-chome, Setagaya-ku, Tokyo, Japan

[21] Appl. No.: 481,251

[22] Filed: Feb. 20, 1990

[30] Foreign Application Priority Data

Feb. 20, 1989 [JP] Japan ................................. 1-38451
Mar. 16, 1989 [JP] Japan ................................. 1-62290
Mar. 31, 1989 [JP] Japan ................................. 1-78144

[51] Int. Cl.$^5$ ............................................. G01P 9/00
[52] U.S. Cl. ................................................. 73/505
[58] Field of Search ............................. 73/505, 518

[56] References Cited

U.S. PATENT DOCUMENTS 4,672,848  6/1987  Gohin et al. ............................. 73/505

Primary Examiner—John E. Chapman
Attorney, Agent, or Firm—Diller, Ramik & Wight

[57] ABSTRACT

An acoustic gyro comprises two vessels disposed at both sides of a single separator, at least one sensing duct coupled with these two vessels, a single sound source provided on the separator to differentially provide a volume change to the two vessels, and at least one sound detector attached to each of at least one sensing duct, wherein, when the gyro is rotated, the sound detector detects a change in the sound pressure caused by the Coriolis force at a position other than an acoustic neutral point within the sensing duct to obtain an output corresponding to an angular rate of the rotation.

17 Claims, 9 Drawing Sheets

Fig. 8a
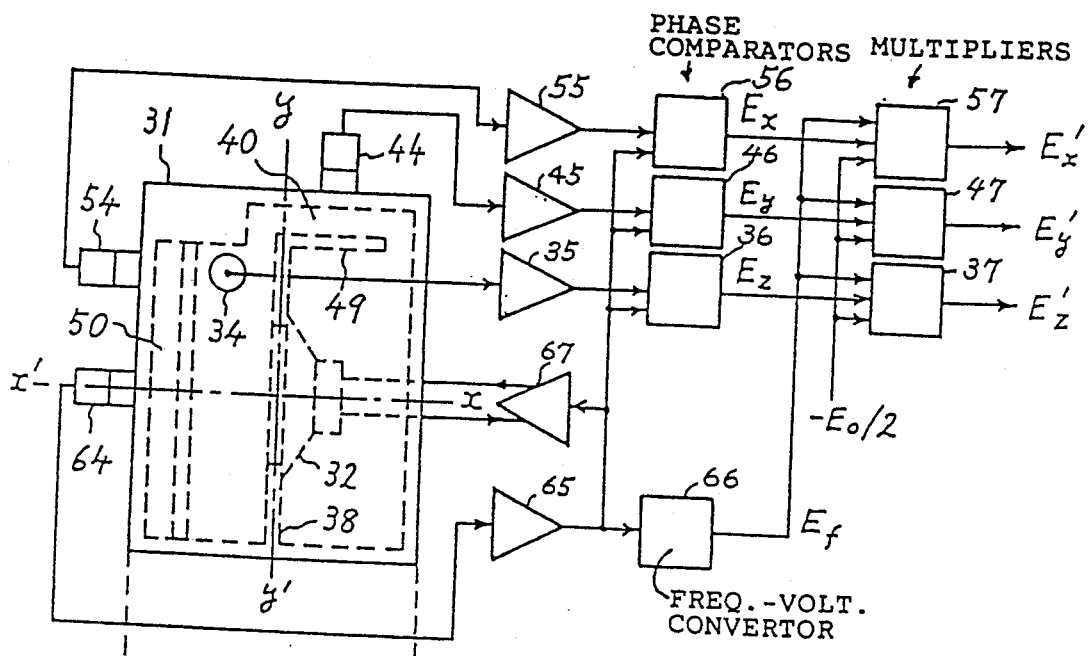
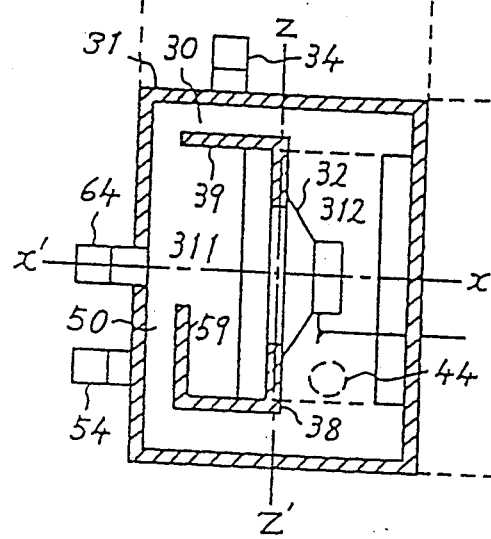
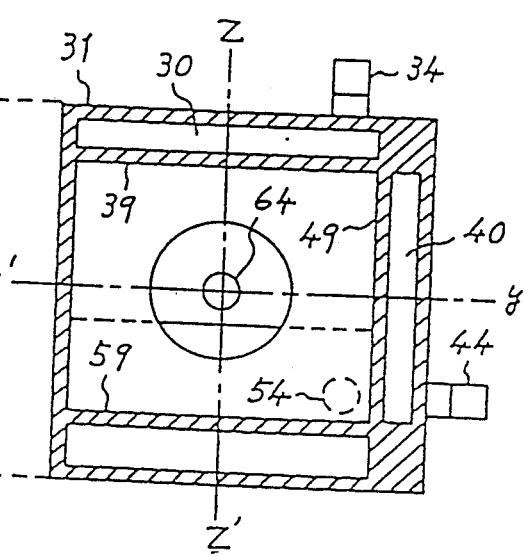
Fig. 8b  Fig. 8c

Fig. 9a
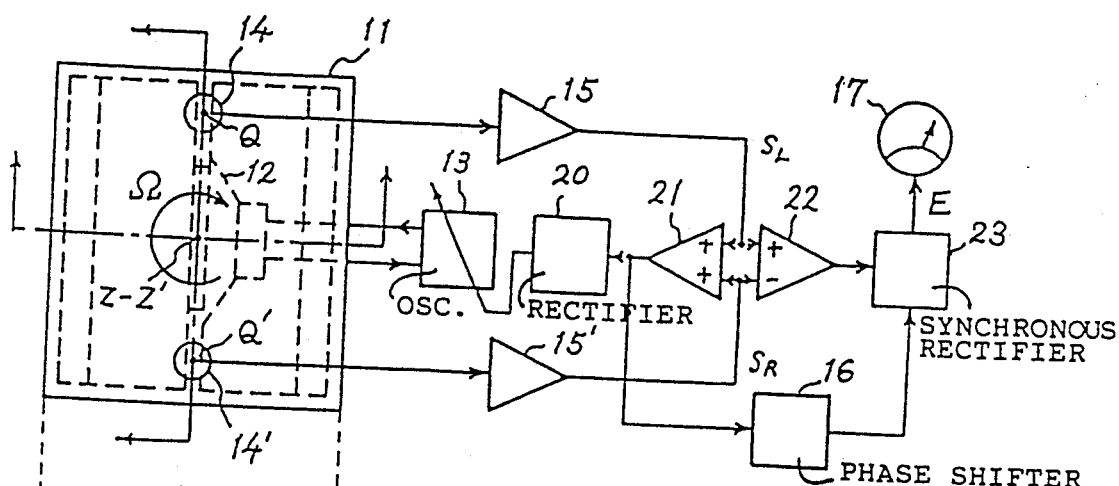
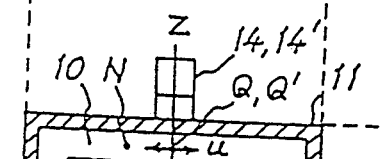
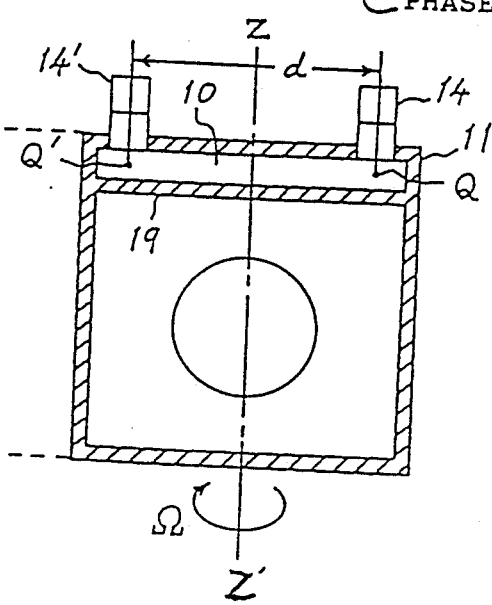
Fig. 9b          Fig. 9c

ACOUSTIC GYROSCOPE

BACKGROUND OF THE INVENTION

1. Field of the Invention

The present invention relates generally to gyroscopes for detecting rotation of coordinates and, more particularly, to an acoustic gyroscope which utilizes a Coriolis force produced when a gas vibrated by sound is subjected to a rotational movement.

2. Description of the Related Art

Of various types of gyroscopes (which will be sometimes referred to merely as the gyros, hereinafter) for detecting rotation of coordinates, there have been put to practical use gyros of types which utilizes the effect of a spinning top, which utilizes a Coriolis force produced when a vibrating tuning fork is subjected to a rotational movement, and a laser gyro which utilizes a phase variation in light caused by the rotational movement of coordinates.

Meantime, Granqvist has disclosed in U.S. Pat. No. 2,999,389 (1961) an acoustic gyro which utilizes a Coriolis force produced when a gas vibrated by sound is subjected to a rotational movement, as shown in FIG. 12. In the drawing, the acoustic gyro includes an elongated casing 1 having a width d and a loudspeaker 2 which is provided at one end of the casing 1 to be driven by a sinusoidal oscillator 3 so that a standing wave of such a pressure distribution as shown by dotted lines is generated inside the casing 1. Connected to both side walls of the casing 1 at both sides of a node M of the standing wave are conduits 8 and 8' which guide sound pressures at their conduit inlets into a differential microphone 4. Assume now that gas particles located at the node M are sinusoidally vibrated at a velocity u(t) (expressed by the following equation (1)) along the longitudinal direction of the casing 1 by means of a sound emitted from the loudspeaker 2, that the casing 1 is rotated at an angular rate $\Omega$ in a direction shown by an arrow, and that the gas in the casing 1 has a gas density $\rho$.

$$u(t) = U\cos\omega t \quad (1)$$

where t denotes time, U denotes velocity amplitude and $\omega$ denotes angular frequency.

Then, the Coriolis force based on the rotation of the gas causes development of a sinusoidal differential pressure (referred to as the Coriolis pressure, hereinafter) $\Delta p(t)$ (expressed by the following equation (2)) which corresponds to a difference between sound pressures at the inlets of the conduits 8 and 8' and which has the same frequency as the velocity u(t) and an amplitude proportional to the quantity $\Omega$.

$$\begin{aligned}\Delta p(t) &= 2\rho d\Omega u(t) \\ &= 2\rho d\Omega U\cos\omega t\end{aligned} \quad (2)$$

The Coriolis pressure $\Delta p(t)$ is detected at the differential microphone 4 and sent to an amplifier 5 and then to a rectifier 6. An output of the rectifier 6, which corresponds to the magnitude of the angular rate, is indicated at an indicator 7. In the illustrated example, the conduits 8 and 8' are connected to the casing 1 at the both sides of the node M in the standing wave. This is for the purpose of detecting the Coriolis pressure $\Delta p(t)$ at a position where the vibration velocity of the gas becomes maximum and the sound pressure of the standing wave for driving the gas becomes zero.

The prior art acoustic gyro explained above is featured by detecting the Coriolis pressure at the node of the standing wave. In the prior art, however, since the loudspeaker 2 as a sound source is disposed at one side of the casing 1, the mechanical characteristics of the loudspeaker 2 directly affect the acoustic characteristics of the casing 1. For example, when the stiffness of a cone of the loudspeaker 2 varies with temperatures or the like, this causes the relation between the driving sound pressure and gas velocity inside the casing 1 to be changed so that the position of the node M is shifted and thus an error occurs in the gyro output. To avoid this, in actual applications, the prior art gyro requires such control means as other control microphones to be connected to the casing 1 to maintain the amplitude U of the gas vibration velocity, apart from the microphone 4 for detection of the Coriolis pressure. However, the addition of such control means involves the complication of the gyro, thus reducing the accuracy of the gyro. In addition, even with the addition of such control means, the influence of long term drift in the sensitivity of the microphones to the output of the gyro is unavoidable. Because of such disadvantages, the acoustic gyro has not been put in practical use yet.

An acoustic gyro of a type different from the aforementioned gyro has been disclosed by Bruneau, Garing and Leblond in the J. Acoust. Soc. Am., Vol. 80, pp. 672-680, 1986, which gyro utilizes a two dimensional standing wave in a box. This gyro, however, has had the same defects as in the aforementioned prior art gyro, since the gyro also has such an arrangement that a Coriolis pressure is detected at a node of the standing wave and a loudspeaker as a sound source is disposed at one end of the box, thus disabling the realization of its practical use.

SUMMARY OF THE INVENTION

In accordance with the present invention, there is provided an acoustic gyro which comprises two vessels disposed at both sides of a single separator, at least one sensing duct coupled with these two vessels, a single sound source provided on the separator to differentially provide a volume change to the two vessels, and at least one sound detector attached to each of at least one sensing duct, wherein, when the gyro is rotated, the sound detector detects a change in the sound pressure caused by the Coriolis force at a position other than an acoustic neutral point within the sensing duct to obtain an output corresponding to an angular rate of the rotation.

One of features of the gyro according to the present invention is that acoustic elements including the vessels and the ducts are coupled each other to form an acoustic bridge and the acoustic bridge is differentially driven by the sound source attached to the separator. With such a unique arrangement, the present invention can eliminate the influence of changes in the mechanical characteristics of the sound source, which would appear in the prior art, and can ensure the stable acoustic characteristics. As a result, even when the microphone used as a sound detector varies in sensitivity, such a signal processing system as to prevent the occurrence of an error can be advantageously employed.

BRIEF DESCRIPTION OF THE DRAWINGS

FIGS. 8a-8c show a detection part used in an acoustic 3-axis gyro of yet another embodiment of the present invention, in which a single sound detector is provided to each of sensing ducts, and also shows a signal processing circuit used in the same gyro and including compensating means for compensating for variation in driving frequency;

FIGS. 9a-9c show plan and vertical sectional views of a detection part and a signal processing circuit used in an acoustic gyro of a type in accordance with yet a further embodiment of the present invention, which detects a variation in the amplitude of a composite signal corresponding to a composition of outputs of sound detectors;

DESCRIPTION OF THE PREFERRED EMBODIMENTS

Figures 1A, 1B, 1C:
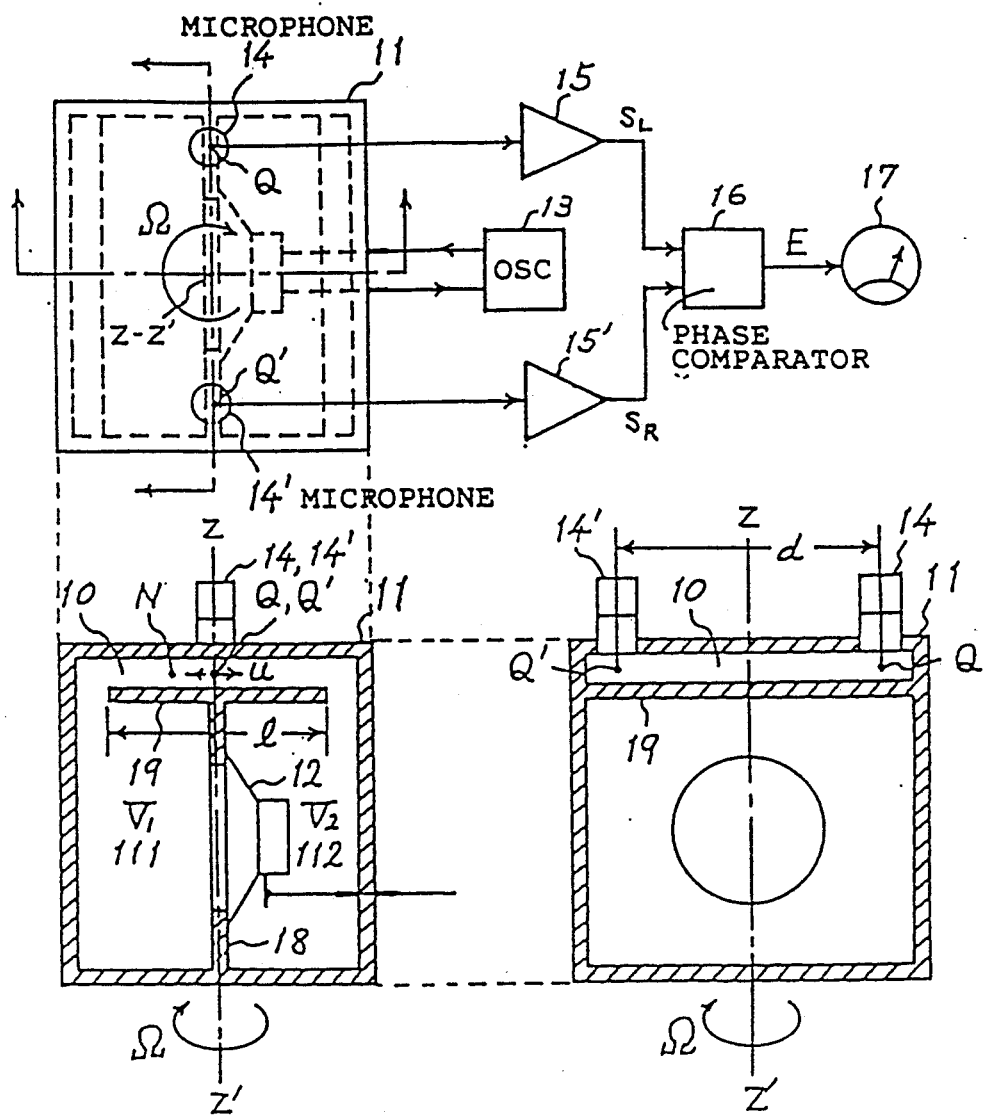
FIGS. 1a-1c show plan and vertical sectional views of a detection part and a block diagram of a signal processing circuit, used in an acoustic gyro of a type detecting phase variations in the outputs of sound detectors in accordance with one embodiment of the present invention.

Referring first to FIGS. 1a-1c, there is shown an acoustic gyro in accordance with an embodiment of the present invention. In the drawing, an acoustically closed casing 11 is filled with a gas as a sound medium and in the present embodiment, with air. The interior of the casing 11 is divided by a separator 18 into two chambers 111 and 112. Mounted on the separator 18 is a loudspeaker 12 as a sound source so that the loudspeaker 12, when driven by a sinusoidal signal of an angular frequency ω sent from an oscillator 13, differentially provides to the respective chambers 111 and 112 volume changes that are equal each other in absolute value and opposite each other in sign. Disposed within the interior of the casing 11 is a plate 19 which is mounted to the separator 18 as intersected therewith in a T-shaped form to define a sensing duct 10 with an upper lid of the casing 11, the duct 10 having a rectangular cross section and a length of l. The air within the duct 10, when subjected by the loudspeaker 12 to a vibratory volume change, sinusoidally vibrates at the velocity u(t) (refer to the equation (1) explained earlier). Mounted on the upper lid of the casing 11 are microphones 14 and 14' as sound detectors which are placed on the line perpendicular to the longitudinal center axis of the duct 10 as spaced from each other by a distance d to detect sound pressures at points Q and Q' in both sides of the interior of the duct 10 respectively. Outputs of the microphones 14 and 14' indicative of their detected sound pressures are amplified at amplifiers 15 and 15' which in turn send their output signals $S_L$ and $S_R$ to a phase comparator 16. The comparator 16 generates an output signal E corresponding to a phase difference between the signals $S_L$ and $S_R$ and applies it to an indicator 17 to indicate the output signal E thereon. In actual applications, the frequency characteristics of the amplifiers 15 and 15' are set to pass only frequency components of the signal in the vicinity of an angular frequency ω to remove unnecessary frequency components from the signal.

Figure 2:
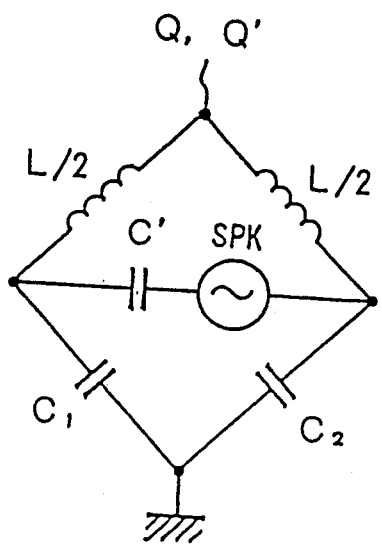
FIG. 2 is an equivalent circuit of an acoustic system in the gyro of FIG. 1.

An acoustic resonance system in the gyro is constituted by the two chambers or vessels 111 and 112 of volumes $V_1$ and $V_2$ divided by the separator 18 and the sensing duct 10 coupling these two vessels. FIG. 2 shows an electrical equivalent circuit of the acoustic system in which reference symbol L denotes the equivalent inductance due to the inertance of the air within the duct 10. Let ρ be the density of air filled within the casing 11 and S be the sectional area of the duct 10. Then the following equation (3) is satisfied.

$$L = \rho l / S \quad (3)$$

Assuming also that $C_1$ and $C_2$ denote equivalent capacitances due to the compressibility of the vessels $V_1$ and $V_2$ respectively, τ denotes the specific heat ratio of air, and $P_n$ denotes the static pressure of air within the casing 11; the following equations (4) and (5) are satisfied.

$$C_1 = V_1 / \tau P_0 \quad (4)$$

$$C_2 = V_2 / \tau P_0 \quad (5)$$

The loudspeaker 12 as the sound source is represented by an A.C. voltage source and an equivalent capacitance C' indicative of the equivalent capacitance sound source. The C' corresponds to the stiffness of a cone part of the loudspeaker, that is, indicates the degree of flexuosity of the cone part when subjected to a sound pressure. When $C_1 C_2 / (C_1 + C_2)$ is rewritten as $C_0$ as shown by the following equation (6), $$C_0 = C_1 C_2 / (C_1 + C_2) \quad (6)$$

the above acoustic system has such a resonance angular frequency ω, as expressed below.

$$\omega_r = 1 / \sqrt{L(C_o + C')} \quad (7)$$

Assume now that the casing 11 is stationary and the loudspeaker 12 is driven by the sinusoidal output signal of the oscillator 13 having the angular frequency ω, so that the air within the duct 10 vibrates at such a velocity $u(t)$ as shown by the equation (1) along the longitudinal direction of the duct 10. Then, sound pressures developed at the points Q and Q' within the duct 10 are equal to each other and become $p(t)$. For example, when the points Q and Q' are positioned at the midpoint of the length of the duct 10, the $p(t)$ is given as follows.

$$p(t) = [(V_1 - V_2)/2(V_1 + V_2)] \omega \tau l U \sin \omega t \tag{8}$$

If $V_1 = V_2$, then an acoustic neutral point N, at which a sound pressure within the sensing duct 10 becomes zero, is located at the center of the duct and thus a relation $p(t) = 0$ is satisfied. The present embodiment, however, is arranged, for example, to meet a relation $V_1 > V_2$, that is, so that the point N is positioned on the left side of the duct center as shown in FIG. 1b to yield such a residual sound pressure as expressed by the equation (8) at the points Q and Q' and in the duct center. And the residual sound pressure is detected by the microphones 14 and 14'. The present embodiment is different from the prior art acoustic gyro which detects a Coriolis pressure at a node of a standing sound wave where a sound pressure becomes zero in the gyro stationary mode.

Next, when the casing 11 is rotated at an angular rate $\Omega$ around a vertical axis z—z' in FIGS. 1a-1c, a differential pressure or Coriolis pressure $\Delta p(t)$ is developed between the points Q and Q' due to the corresponding Coriolis force. In this case, sound pressures $p_L(t)$ and $p_R(t)$ at the points Q and Q' during rotation of the casing 11 are expressed by the following equations (9) and (10) which correspond to $\frac{1}{2}$ of the Coriolis pressure $\Delta p(t)$ added to and subtracted from the sound pressure at the points Q and Q' in the stationary state of the casing 11, respectively. That is, $$\begin{aligned} p_L(t) &= p(t) + \Delta p(t)/2 \\ &= [(V_1 - V_2)/2(V_1 + V_2)] \omega \rho l U \sin \omega t + \\ &\quad \rho d \Omega U \cos \omega t \\ &= A \sin(\omega t + \theta) \end{aligned} \tag{9}$$

$$\begin{aligned} p_R(t) &= p(t) - \Delta p(t)/2 \\ &= [(V_1 - V_2)/2(V_1 + V_2)] \omega \rho l U \sin \omega t - \\ &\quad \rho d \Omega U \cos \omega t \\ &= A \sin(\omega t - \theta) \end{aligned} \tag{10}$$

where A and $\theta$ are written as follows.

$$A = \rho U \sqrt{[(V_1 - V_2)\omega l / 2(V_1 + V_2)]^2 + [d\Omega]^2} \tag{11}$$

$$\theta = \tan^{-1} [2(V_1 + V_2) d\Omega / (V_1 - V_2) \omega l] \tag{12}$$

As will be seen from the above equations, the sound pressures $p_L(t)$ and $p_R(t)$, which vary, in the phase $\theta$ with the angular rate of rotation $\Omega$, have a phase difference $2\theta$ therebetween. Accordingly, the same phase difference occurs between the signals $S_L$ and $S_R$ as the outputs of the amplifiers 15 and 15'.

Figure 3:
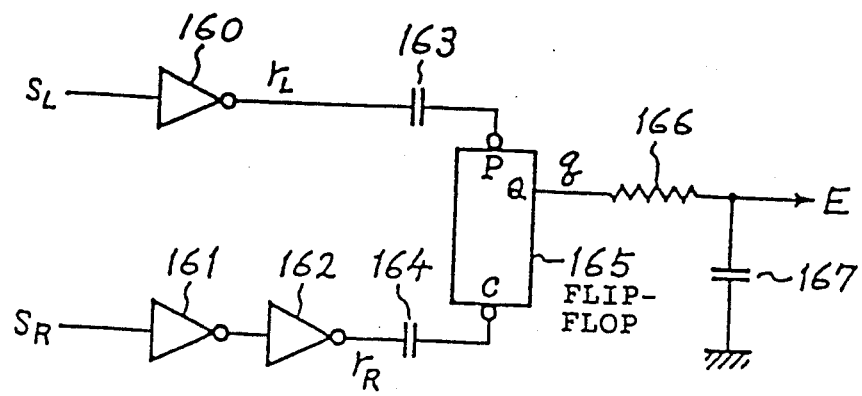
FIG. 3 is an example of phase comparator used in the embodiment.
Figure 4:
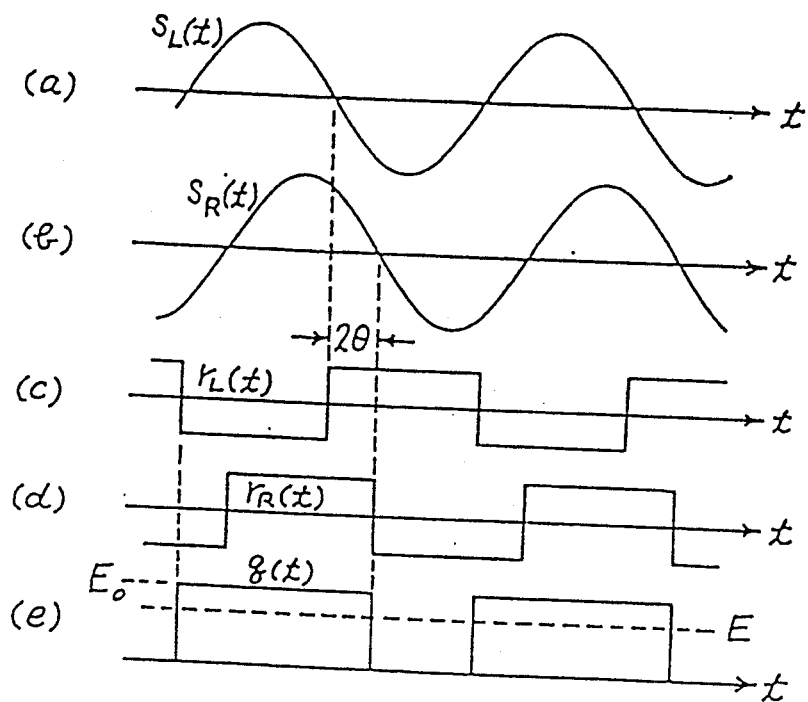
FIG. 4:, shows waveforms of signals appearing various points in the circuit of FIG. 3.

The phase comparator 16 for detecting the phase difference may employ various known types regardless of the analog or digital type. An example of the phase comparator is shown in FIG. 3 in which the signals $S_L$ and $S_R$ are such sinusoidal waves mutually different in phase by $2\theta$ as shown in FIG. 4(a) and (b) and are converted through inverters 160, and 161 and 162 to such rectangular signals $r_L$ and $r_R$ as shown in FIG. 4(c) and (d), respectively. These rectangular signals are further supplied through coupling capacitors 163 and 164 to preset and clear terminals P and C of a flip-flop 165, respectively. The flip-flop 165 functions to repeat its set and clear operations in synchronism with the falling of the signals $r_L$ and $r_R$. The flip-flop 165 generates such a rectangular output voltage q as shown in FIG. 4(e), which voltage q is further passed and smoothed through a smoothing filter of a resistor 166 and a capacitor 167 and finally is output as an output signal E of the phase comparator of FIG. 3. Accordingly, when the phase difference $2\theta$ corresponding to the angular rate of rotation $\Omega$ varies, this causes the duty ratio of the output voltage q to be changed so that the magnitude of the output signal E is correspondingly varied. The magnitude of the signal E is indicated on the indicator 17.

Figure 5:
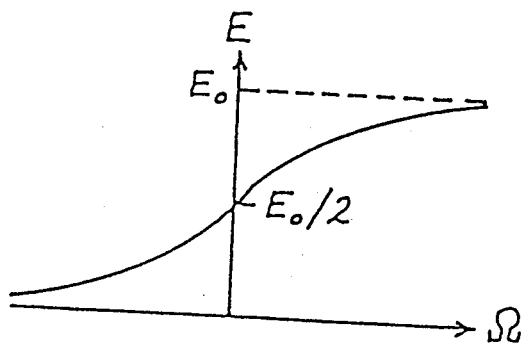
FIG. 5 is a graph showing a relationship between an output signal and an angular rate of rotation appearing in the embodiment of FIG. 1.

A relationship between the angular rate $\Omega$ and output signal E, as seen from the equation (12), is expressed in the form of a non-linear characteristic curve as shown in FIG. 5. In the case where unequally graduated scale based on the non-linear characteristic is applied to the indicator 17, the value of the angular rate $\Omega$ can be directly read. Further, it is also easy to know the rotational angle of coordinates by passing the output signal E through a function generator having an inverse characteristic to the above non-linear characteristic to convert the signal E into a signal having a magnitude proportional to the angular rate $\Omega$, and then by supplying the converted signal to an external device to be subjected to an integrating operation, e.g., by analog or digital means.

The present embodiment of FIGS. 1a-1c will be explained in connection with its specific example in which particular numerical values are given. That is, the volumes $V_1$ and $V_2$ of the two chambers 111 and 112 in the casing 11 were set to be nearly equal to 40 cm$^3$, the duct 10 was set to have the sectional area S of 0.77 cm$^2$ ($=4.5$ cm$\times$0.17 cm) and the length l of 3 cm. Further, electret type microphones were employed as the microphones 14 and 14', the spacing d between the microphones 14 and 14' was set at 4 cm, the casing 11 was filled with 1-atm air, and the air was driven by the small speaker 12 having a diameter of 4 cm in the form of a sinusoidal wave having a frequency of 210 Hz ($=1320$rad/s). Under the above conditions, the two chambers 111 and 112 had respectively a sound pressure of 120dB ($=20$Pa $_{RMS}$) therein. When the chambers were adjusted to have a volume difference ($V_1 - V_2$) of 1.3 cm$^3$, the phase difference $2\theta$ was 14° for the angular rate $\Omega$ of 1 rad/s. When the phase difference $2\theta$ is about 14° or less, the equation (12) is approximated as follows.

$$\theta = 2(V_1 + V_2) d\Omega / (V_1 - V_2) \omega l \tag{13}$$

Hence, it will he noted from the above equation that the output signal E is proportional to the $\Omega$, which means that the need of such non-linear characteristic compensation as stated above can be eliminated.

Figure 12:
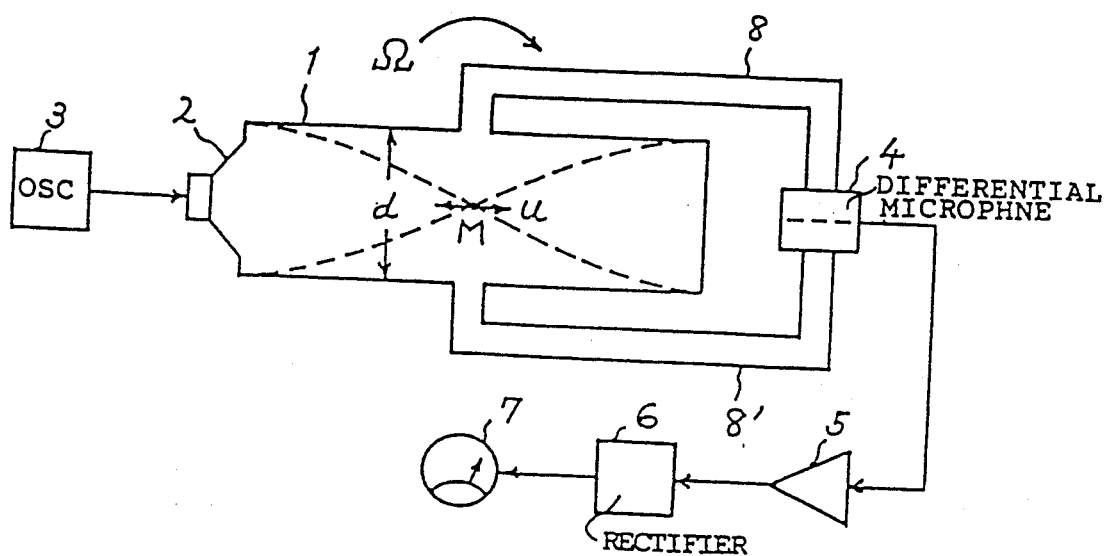
FIG. 12 shows a prior art acoustic gyro.
Figure 13:
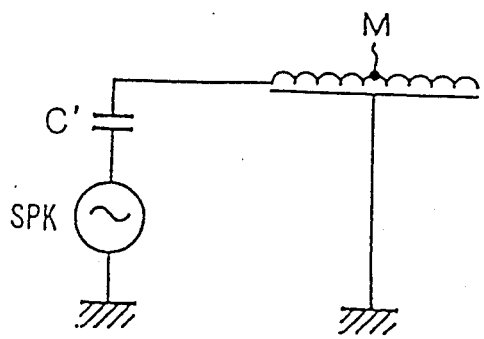
FIG. 13 is an equivalent circuit of an acoustic system of the gyro of FIG. 12.

As seen from the equations (12) or (13), the sensitivity of the embodiment as a gyro is independent of the amplitude U of the gas vibratory velocity. This eliminates the need for the control of maintaining the amplitude U constant. Further, since the angular rate of rotation is detected in the form of a phase variation, the gyro sensitivity is not affected by a variation in the microphone sensitivity. The feasibility of employing a signal processing system having the aforementioned advantages stems from the fact that the acoustic neutral point N within the sensing duct 10 is stable in position, which in turn results from the unique arrangement of the gyro of the present invention wherein the acoustic bridge is differentially driven by the sound source. This can be estimated from the fact that the output impedance of the sound source speaker represented by the equivalent capacitance C' is not contained in the equation (8) of the stationary condition of the gyro. The value of the C' equivalent capacitance is much larger, even when a small loudspeaker is employed, than the equivalent capacitances $C_1$ and $C_2$ of the volumes $V_1$ and $V_2$. For this reason, if the C' equivalent capacitance were contained in the equation (8), then the position of the neutral point N would vary with the temperature variation of the cone characteristic of the loudspeaker, thus resulting in that a large error takes place in the gyro output. FIG. 13 is an equivalent circuit of the prior art acoustic gyro of FIG. 12, in which the casing ]in FIG. 12 is expressed by an electromagnetic delay line. In the equivalent circuit, the sound source is connected to one end of the delay line in the form of unbalanced form so that a variation in the equivalent capacitance C' of the sound source directly affects the position of the node M in the standing wave.

In the embodiment of FIGS. 1a-1c, the microphones 14 and 14' are disposed at the both sides of the duct 10 but the positions of the microphones are not limited to the particular ones. For example, as shown in an embodiment of the present invention in FIGS. 6a-6c, the microphones 14 and 14' may be positioned on the upper lid of the casing 11 as both biased at one side thereof to detect the sound pressures at the points Q and Q' located within the duct 10 as both biased at one side thereof. In the present embodiment of FIGS. 6a-6c, further, the volume $V_1$ is set equal to the volume $V_2$ so that the acoustic neutral point N (at which the sound pressure becomes zero) is positioned at the center of the length l of the duct 10. Other arrangement is substantially the same as that of FIGS. 1a-1c. With such an arrangement, in the stationary mode of the gyro, the sound pressures at the points Q and Q' which are mutually out of phase by a phase difference of 180°, i.e., anti-phase, so that when the sound pressure at the point Q is denoted by p(t), the sound pressure at the point Q' is by −p(t). When the casing 11 rotates at the angular rate Ω around the z—z axis, this causes the generation of the Coriolis pressure Δp(t), which pressure is added to the sound pressures at the points Q and Q' in phase with them. That is, the sound pressure at the point Q is p(t)+Δp(t)/2, while the sound pressure at the point Q' is −p(t)+Δp(t)/2. Accordingly, the phase difference between these two sound pressures varies with the angular rate of the rotation of the casing. A change in the phase difference is detected through the same signal processing circuit as in FIGS. 1a-1c and the gyro generates an output corresponding to the then angular rate Ω.

Figure 6A:
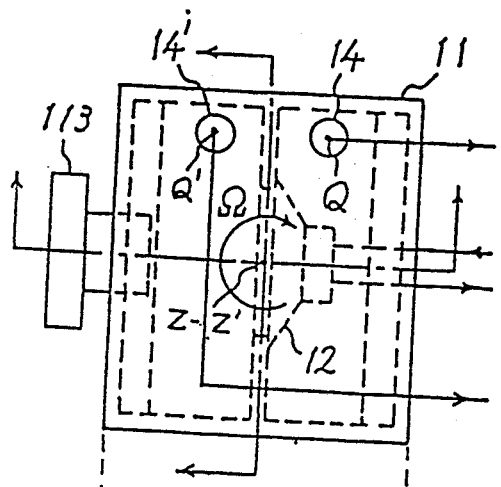
FIGS. 6a-6c show a detection part used in an acoustic gyro of another embodiment of the present invention, in which sound detectors are disposed at one side of a sensing duct.
Figure 6B:
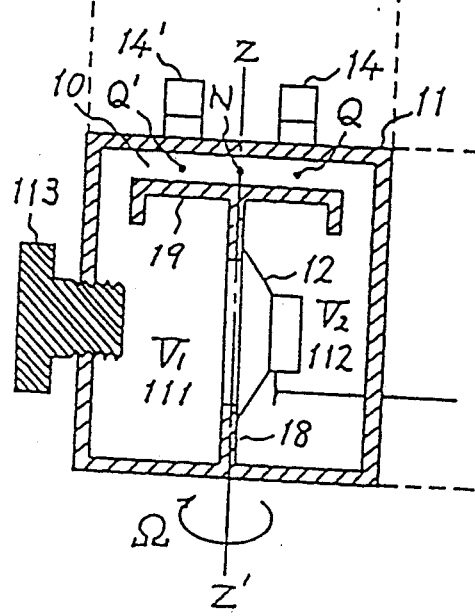
Figure 6C:
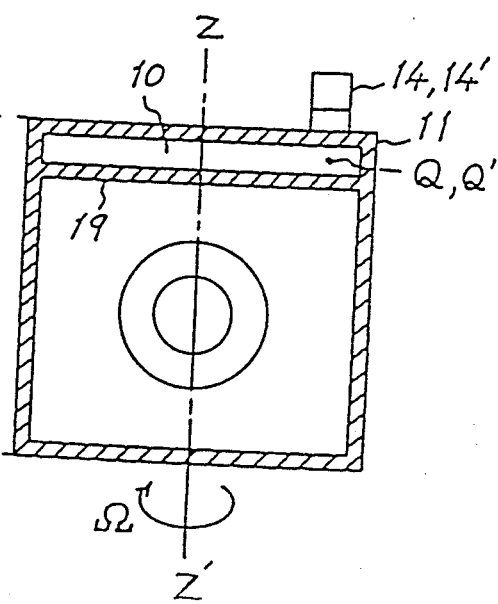

In FIGS. 6b and 6c, the plate 19 is integrally provided at its both ends with projections bent downwardly at right angles. This is employed when it is desired to increase the effective length of the sensing duct 10. In other words, the sensing duct 10 is not restricted to the particular straight configuration which is extended as shown in FIG. 1b but may employ such a bent configuration as shown in FIG. 6b. Attached to the side wall of the casing 11 as passed therethrough and projected into the chamber 111 is a plug 113 which is used to adjust the volume $V_1$ of the chamber 111. More specifically, the projection amount of the plug 113 from the casing wall into the chamber 111 is adjusted to satisfy a relation $V_1=V_2$ by rotating the plug 113.

Both of the foregoing embodiments mentioned above have been arranged to detect the angular rate of rotation on only one axis. In the case where two sensing ducts are positioned to be perpendicular to each other and are both driven by a common sound source, a so-called 2-axis gyro can he obtained. An example of the 2-axis gyro is shown in FIGS. 7a-7c.

Figure 7A:
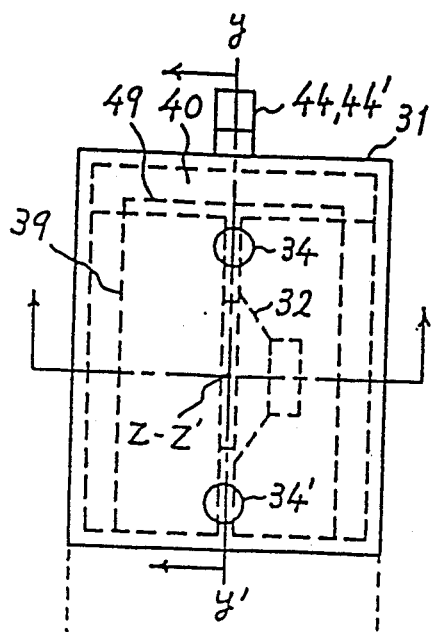
FIGS. 7a-7c show a detection part used in an acoustic 2-axis gyro of a further embodiment of the present invention, in which two sound detectors are provided to each of sensing ducts.
Figure 7B:
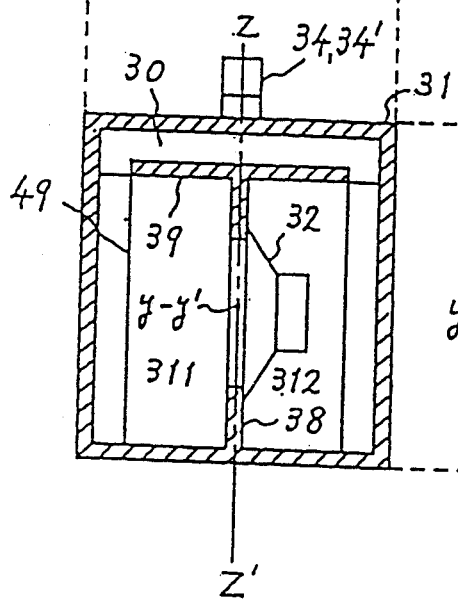
Figure 7C:
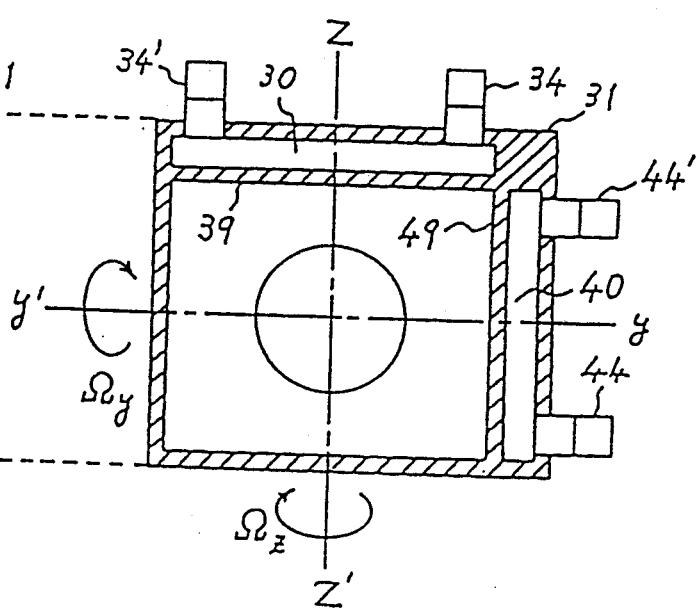

Referring to FIGS. 7a-7c, the interior space of a casing 31 is separated by a separator 38 into two chambers 311 and 312. Two plates 39 and 49 are provided to intersect with the separator 38 respectively in a T shape form. The plate 39 defines a sensing duct 30 together with an upper lid of the casing 31, while the plate 49 defines a sensing duct 40 together with one side wall of the casing 31. Mounted on the separator 38 is a loudspeaker 32 as a sound source which is driven by a sinusoidal signal sent from an oscillator (not shown). When the loudspeaker 32 is driven, the air confined within the ducts 30 and 40 sinusoidally vibrates at the same frequency as the driving sinusoidal signal. Microphones 34, 34', 44 and 44' as sound detectors are provided so that the microphones 34 and 34' detect sound pressures at points located at both sides of the duct 30, whereas the microphones 44 and 44' detect sound pressures at points located at both sides of the duct 40, respectively. As in the gyro of FIGS. 1a-1c, the two chambers 311 and 312 are adjusted so that acoustic neutral points for these sound pressures are positioned slightly away from the associated microphone positions. Even when the casing 31 is stationary, such a sound pressure as expressed by the equation (8) is detected at the each microphone. When the casing 31 is rotated at an angular rate $\Omega_Z$ around a vertical axis z—z', the microphones 34 and 34' generate signals corresponding to sound pressures expressed by the equations (9) and (10). A phase difference between these signals is detected through the same signal processing circuit as in FIGS. 1a-1c and the gyro generates a first output signal corresponding to the then $\Omega_Z$. When the casing 31 is rotated at an angular rate $\Omega_Y$ around a horizontal axis y—y', on the other hand, this causes the microphones 44 and 44' to generate similar signals which are then detected through another signal processing circuit (different from that for the $\Omega_Z$) so that the gyro generates a second output signal corresponding to the then $\Omega_Y$.

Shown in FIGS. 8a-8c is a 3-axis gyro in accordance with a further embodiment of the present invention, in which a detection part is different from that in FIGS. 7a-7c in two points. That is, firstly, a third sensing duct 50 is disposed between a plate 59 of L-shaped section and one side wall of the casing 31 to be perpendicular to both the ducts 30 and 40, so that the angular rate of rotation around an x—x' axis can he additionally detected. Secondly, a single microphone is provided at one side of each of the sensing ducts 30, 40 and 50. The rotation of the casing 31 causes these microphones to generate signals corresponding to such sound pressures as expressed by the equations (9) and (10). For obtaining a reference signal on the basis of which these signal are to be compared, a microphone 64 is provided for detecting a sound pressure in the chamber 311 to use it as the reference signal. An output of the microphone 34 is amplified at an amplifier 35 and then applied to a phase comparator 36 as its one input. An output of the microphone 64 is amplified at an amplifier 65 and then applied to the phase comparator 36 as the other input. That is the phase comparator 36 compares its two inputs with respect to phase. Since a pressure in the chamber 311 is in phase with the p(t) given by the equation (8) and is not subjected to any phase variations when undergoes a rotation, a phase difference between the two inputs of the phase comparator 36 is $\theta$, which result in that the phase comparator 36 detects the $\theta$ and generates an output signal $E_Z$ corresponding to the angular rate of rotation around the z—z' axis. Similarly, outputs of the microphones 44 and 54 are amplified at amplifiers 45 and 55 and then applied to phase comparators 46 and 56 as their one inputs, which comparators in turn detect phase differences between the inputs and the other input signal supplied commonly from the amplifier 65 and generate output signals $E_Y$ and $E_X$ corresponding to the angular rates of rotation around the y—y' and x—x' axes, respectively.

It should be noted that the microphone 64 is not necessarily provided. What is required is a reference signal which yields no phase variation by the rotation. For this reason, a driving voltage for the loudspeaker 32 may be obtained from an output of an amplifier 67 so that the driving voltage of the loudspeaker 32 is supplied to the phase comparators 36, 46 and 56 for phase comparison instead of the output of the amplifier 65.

As has been explained above, the sensitivity of the gyro of present embodiment using the method for providing one microphone to one sensing duct is reduced to ½ that of the foregoing embodiment using the method for providing two microphones to one sensing duct. Since the present embodiment requires a less number of necessary amplifiers, however, it is advantageous for use as a multi-axis gyro.

The acoustic system of the gyro of the present invention is a resonance system having such a resonance angular frequency $\omega_r$ as expressed by the equation (7) as mentioned earlier and the $\omega_r$ does not affect directly the output signal of the gyro, so that a driving angular frequency $\omega$ can be set independently of the $\omega_r$. From the viewpoint of obtaining a larger driving sound pressure with a smaller input power to the sound source, however, it is advantageous to make the driving frequency coincide with the $\omega_r$. To this end, the sound source, the amplifier for driving the sound source and the aforementioned acoustic resonance system are set to form an oscillation circuit which oscillates always at an angular frequency of $\omega_r$. More specifically, as shown in FIG. 8, the output of the amplifier 65 is fed back to the input of the power amplifier 67 for the driving of the loudspeaker 32 as the sound source to cause the oscillation circuit to sustain its oscillation.

Now, there arises a problem that, as seen from the equation (13), the sensitivity of the gyro is practically inversely proportional to the $\omega$, which results in that a variation in the resonance angular frequency $\omega_r$ due to temperature causes a corresponding variation of the driving angular frequency, thus leading to an error in the sensitivity. For the purpose of compensating for this error, the embodiment of FIGS. 8a-8c is arranged so that the output of the amplifier 65 is applied to a frequency-voltage converter 66 to obtain a voltage signal $E_f$ having a magnitude proportional to the driving angular frequency, and then the signal $E_f$ and the aforementioned signals $E_z$, $E_y$ and $E_x$ are applied to multipliers 37, 47 and 57 to obtain products of the signals and thus compensated output signals $E_z'$, $E_y'$, and $E_x'$, respectively. In the case, the signals $E_z$, $E_y$, and $E_x$ have a D.C. bias of $E_0/2$ as shown in FIG. 5, the D.C. bias is subtracted from $E_z$, $E_y$ and $E_x$ before the multiplication by the signal $E_f$ mentioned above.

FIGS. 9a-9c shows an embodiment of the present invention which includes a detection part and a signal processing circuit of a type detecting a variation in the amplitude of a composite signal of outputs from microphones. The arrangement of the detection part is the same as that of FIGS. 1a-1c, but the signal processing circuit is different from that of FIGS. 1a-1c.

More in detail, outputs of the microphones 14 and 14' are amplified at the amplifiers 15 and 15' which in turn generate signals $S_L$ and $S_R$ and then apply them to summing and subtracting amplifiers 21 and 22 as their one inputs, respectively. An output of the summing amplifier 21, which corresponds to a sum of the signals $S_L$ and $S_R$, is converted at a rectifying circuit 20 into a D.C. signal that is proportional to the amplitude of its input signal and then sent to an oscillator 13 so that the D.C. signal is used to control the magnitude of an output of the oscillator 13. This magnitude control of the oscillator 13 causes the magnitude of the sum of the signals $S_L$ and $S_R$ to be maintained at a constant level. An output of the subtracting amplifier 22, on the other hand, which corresponds to a difference between the signals $S_L$ and $S_R$, is applied to a synchronous rectifier 23 at its one input. Also applied to the other input of the synchronous rectifier 23 is a synchronizing signal which is obtained by advancing the output of the summing amplifier 21 by a phase of 90° through a phase shifter 16. That is, the synchronous rectifier 23 extracts the magnitude of components in phase with the above synchronizing signal from the output of the subtracting amplifier 22 indicative of the difference between the signals $S_L$ and $S_R$ and generates an output signal E. The output signal E, which is proportional to the angular rate of rotation of the casing 11 to be proved later, is indicated on the indicator 17.

The signals $S_L$ and $S_R$ correspond to the sound pressures $p_L(t)$ and $p_R(t)$ expressed by the equations (9) and (10) respectively, which are rewritten as follows.

$$p_L(t) = p(t) + \Delta p(t)/2 \qquad (14)$$
$$= P\sin\omega t + KP\Omega\cos\omega t$$

$$p_R(t) = p(t) - \Delta p(t)/2 \qquad (15)$$
$$= P\sin\omega t - KP\Omega\cos\omega t$$

where the parameter P denotes the amplitude of the p(t) which is given as follows.

$$P=(V_1-V_2)\omega\rho l U/2(V_1+V_2) \qquad (16)$$

and the parameter K is
$$K=2(V_1+V_2)d/(V_1-V_2)\omega l \qquad (17)$$

As has already mentioned above, to maintain the magnitude of the sum of the signals $S_L$ and $S_R$ means to keep the amplitude of $p_L(t)+p_R(t)=2p(t)$, i.e., 2P constant. And to detect a difference between the signals $S_L$ and $S_R$ through the synchronous rectifier 23 means to detect the amplitude of $p_L(t)-p_R(t)=\Delta p(t)$, i.e., $2KP\Omega$ to obtain the output signal E. Since the value of the K is determined by the shape of the casing 11 and the driving angular frequency $\omega$ and the value of the P is previously kept constant, the output signal E is proportional to the angular rate of rotation $\Omega$. Even in this embodiment, a variation in the driving angular frequency ω causes the value of the K to be varied inversely proportionally thereto, which results in a variation of the sensitivity of the gyro. To avoid this, such compensation means as shown in FIGS. 8a–8c may be applied.

In the present embodiment, the microphones 14 and 14' are used commonly both to keep constant the magnitude of the driving sound pressure p(t) and to detect the magnitude of the Coriolis pressure Δp(t). As a result, a less number of amplifiers are only required, the signal processing circuit can be simplified, and further the influence of the microphone sensitivity on the gyro output E due to its long term drift and temperature change can be compensated for to some extent. The feasibility of the common use of the microphones as detecting ones and also as control ones requires, as its necessity, the stability of the position of the acoustic neutral point N in the sensing duct 10. This requirement is satisfied by the unique arrangement of the detection part in the gyro of the invention. In the case of the prior art acoustic gyro of FIG. 12, on the other hand, the node M is unstable in position. This involves the necessity of controlling operations including keeping constant the amplitude U of the gas vibratory velocity and so on. For this reason, the prior art gyro of FIG. 12 requires the use of other control microphones in addition to the sensing microphone 4.

Figure 10:
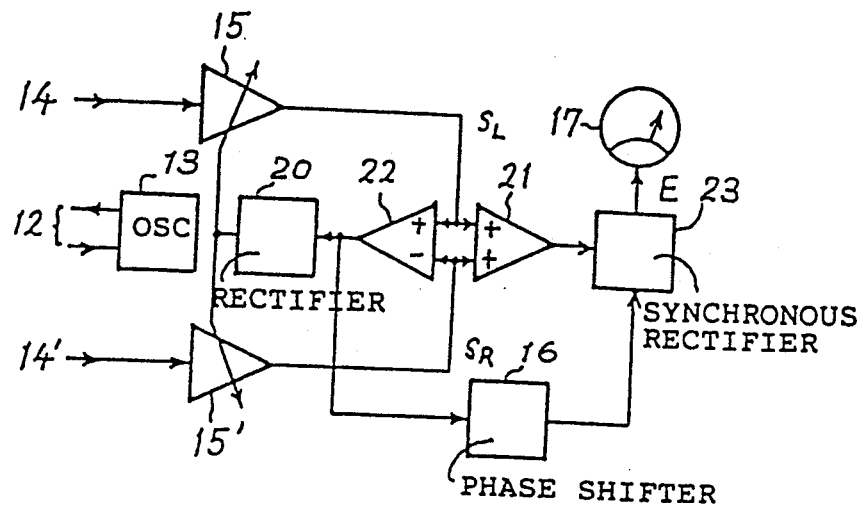
FIG. 10 shows another example of the signal processing circuit which detects a variation in the amplitude of a composite signal.

Although the output of an oscillator 13 is controlled to maintain constant the magnitude of the sum of the signals $S_L$ and $S_R$ in a signal processing circuit used in the gyro of FIG. 9a–9c, such a signal processing circuit may be employed that the output of the oscillator 13 is kept constant and the output of the rectifier circuit 20 is used to adjust the gains of the two amplifiers 15 and 15' at the same time as shown in FIG. 10. In other words, so long as the magnitude of the sum of the signals $S_L$ and $S_R$ is kept constant, any means for carrying out it can be employed.

When the signal processing circuit used in the gyro of FIGS. 9a–9c is connected to each of two pairs of the microphones 34 and 34', and 44 and 44' in the detection part of FIGS. 7a–7c, there can be obtained a 2-axis gyro. In this case, a single loudspeaker is provided as a sound source and also is driven by the single oscillator 13. Accordingly, when the aforementioned method for controlling the output of the oscillator 13 for example is used to keep constant the magnitude of the sum of the the outputs of the microphones 34 and 34', the gains of the amplifiers following microphones 44 and 44' must he adjusted as mentioned above in order to maintain constant the magnitude of the sum of the output of the microphones 44 and 44'.

FIG. 10 also shows a method to make a gyro in which the signal processing circuit of FIG. 10 is connected to the detection part of FIGS. 6a–6c having the microphones disposed as biased at one side of the sensing duct. In this case, sound pressures sensed at the microphones 14 and 14' are +p(t) and −p(t) which are out of phase by 180° each other in the stationary mode of the gyro, whereas Coriolis pressures to be superimposed on these sound pressures are equal to and in phase with each other, that is, Δp(t)/2 in the gyro rotation mode. Thus, in contrast with the case of FIGS. 9a–9c, the output of the subtracting amplifier 22 is rectified at the rectifier circuit 20 to adjust the gains of the amplifiers 15 and 15' and the output of the summing amplifier 21 is applied to the synchronous rectifier 23 to detect a difference between the signals $S_L$ and $S_R$. And the output of the subtracting amplifier 22 is also supplied to the phase shifter 16. with the present embodiment, in short, while the magnitude of the difference between the microphone outputs is controlled to be kept constant, the magnitude of the sum of the microphone outputs is detected to obtain the gyro output E which is proportional to the angular rate of rotation.

Figure 11:
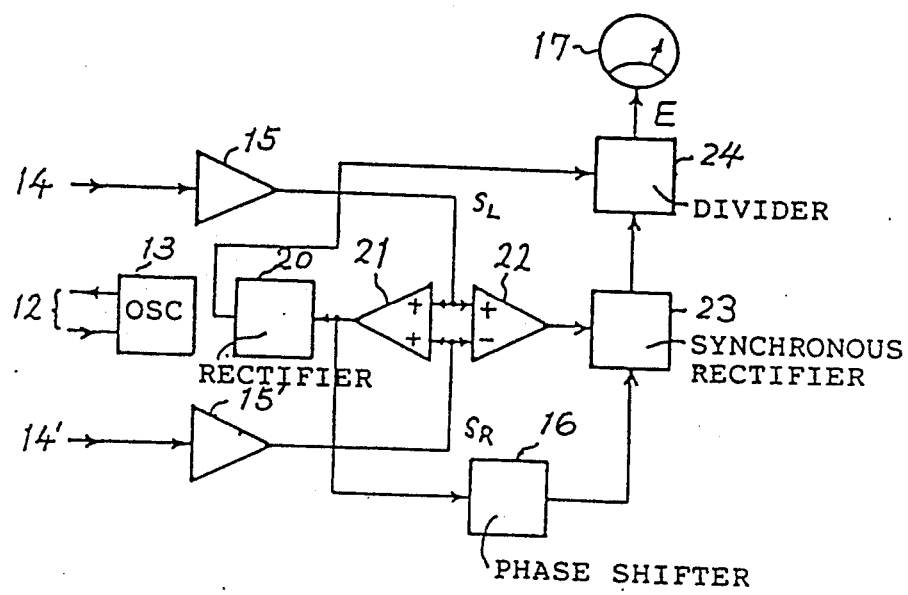
FIG. 11 shows an example of the signal processing circuit which detects a ratio between the magnitudes of composite signals.

FIG. 11 shows a signal processing circuit usable in a gyro in accordance with an embodiment of the present invention, which corresponds to the signal processing circuit used in the gyro of FIG. 9a–9c but which is different therefrom in that the output of the rectifier 20 is applied to a divider 24 to divide the output of the synchronous rectifier 23 and obtain the output signal E of the gyro, unlike the output of the rectifier 20 is applied to the oscillator 13 to control the output of the oscillator in FIGS. 9a–9c. More specifically, the output signal E corresponds to a ratio of the magnitude of a difference between the signals $S_L$ and $S_R$ and the magnitude of a sum thereof. That is, $$E = 2KP\Omega/2P = K\Omega \\ = 2(V_1 + V_2)d\Omega/(V_1 - V_2)\omega l \tag{18}$$

Hence it will be seen from this equation that the output signal E is proportional to the angular rate Ω. The signal processing circuit of FIG. 11 may be used in combination with the detection part in FIGS. 6a–6c by replacing the summing amplifier 21 with a subtracting amplifier and the subtracting amplifier 22 with a summing amplifier. In addition, when the present signal processing circuit is combined with the detection part in FIGS. 7a–7c to be connected to each of the two pairs of microphones 34 and 34' and 44 and 44', a 2-axis gyro can be arranged.

As will be noted from comparison between the equations (18) and (13), the signal processing operation of the circuit of FIG. 11 is essentially equivalent to the circuit of the type of FIGS. 1a–1c detecting a phase variation or difference between the microphone outputs. Therefore, the circuit of FIGS. 1a–1c has advantages similar to the phase-difference detecting type that the output signal E is independent of the amplitude U of the gas vibratory velocity, the circuit is not affected by the microphone sensitivity, and so on.

Although the gas in the detection part has been explained as air in the foregoing embodiments of the present invention, the gas may be replaced by a suitable sort of gas. For example, for the purpose of preventing the oxidation of the detection part, the detection part may have a sealed structure and be sealingly filled with a dry nitrogen gas. Moreover, when the detection part is sealingly filled with the gas at a high pressure, the loudspeaker efficiency can be improved and a large driving sound pressure can be realized, thereby enabling the improvement of the signal-to-noise ratio.

What is claimed is:

1. A gyroscope for measuring an angular rate of rotation based on a coriolis force caused when a gas vibrated by a sound is subjected to a rotational movement, comprising:

two adjacent vessels disposed at both sides of a separator to be coupled to each other through at least one sensing duct, said vessels and said sensing duct being filled with said gas as a sound medium;

a sound source mounted on said separator to differentially provide a volume change to said two vessels and to acoustically drive the gas in the vessels;

a plurality of sound detectors each of which is coupled to said at least one sensing duct; and a signal processing circuit for detecting changes of the outputs of said sound detectors caused when said gyroscope is rotated.

2. A gyroscope as set forth in claim 1, wherein said sound source is a loudspeaker.

3. A gyroscope as set forth in claim 1, wherein said plurality of sound detectors are microphones.

4. A gyroscope as set forth in claim 1, wherein said vessels are adjusted with respect to their volumes by means of a plug which is projected into one of the vessels.

5. A gyroscope as set forth in claim 1, wherein two of said sensing ducts are disposed to be perpendicular to each other.

6. A gyroscope as set forth in claim 1, wherein three of said sensing ducts are disposed to be perpendicular to one another.

7. A gyroscope as set forth in claim 1, wherein two of said sound detectors are provided to each of said at least one sensing ducts to detect sound pressures at points located in the sensing duct at both sides thereof.

8. A gyroscope as set forth in claim 1, wherein two of said sound detectors are provided to each of said at least one sensing duct to detect sound pressures at points located in the sensing duct at one side thereof.

9. A gyroscope as set forth in claim 1, wherein one of said sound detectors is provided to each of said at least one sensing duct to detect a sound pressure at a point located in the sensing duct at one side thereof.

10. A gyroscope as set forth in claim 7, wherein said signal processing circuit is arranged to detect a phase difference between outputs of said two sound detectors.

11. A gyroscope as set forth in claim 9, wherein said signal processing circuit is arranged to detect a phase change in an output of one of said sound detectors caused when said gyroscope is rotated.

12. A gyroscope as set forth in claim 7, wherein said signal processing circuit is arranged to detect a magnitude of a difference between outputs of said two sound detectors while keeping constant a magnitude of a sum of the outputs of the two sound detectors.

13. A gyroscope as set forth in claim 8, wherein said signal processing circuit is arranged to detect a magnitude of a sum of the outputs of said two sound detectors while keeping constant a magnitude of a difference between outputs of the two sound detectors.

14. A gyroscope as set forth in claim 7, wherein said signal processing circuit is arranged to detect a ratio between a magnitude of a difference of outputs of said two sound detectors and a magnitude of a sum thereof.

15. A gyroscope as set forth in claim 1, further comprising an additional circuit for correcting an output of said signal processing circuit with use of a signal that is proportional to a driving frequency of said sound source.

16. A gyroscope as set forth in claim 8, wherein said signal processing circuit is arranged to detect a phase difference between outputs of said two sound detectors.

17. A gyroscope as set forth in claim 8, wherein said signal processing circuit is arranged to detect a ratio between a magnitude of a difference of outputs of said two sound detectors and a magnitude of a sum thereof.

* * * * *